United States Patent
Todorovic

(10) Patent No.: US 8,307,945 B2
(45) Date of Patent: Nov. 13, 2012

(54) GAS-TURBINE EXHAUST CONE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/180,073

(22) Filed: Jul. 11, 2011

(65) Prior Publication Data
US 2012/0006614 A1    Jan. 12, 2012

(30) Foreign Application Priority Data
Jul. 12, 2010   (DE) .......................... 10 2010 026 834

(51) Int. Cl.
*F02K 1/04* (2006.01)
*F01N 1/02* (2006.01)
*F01N 1/08* (2006.01)
*F01N 1/12* (2006.01)
*F02K 1/00* (2006.01)
*F01N 1/00* (2006.01)

(52) U.S. Cl. ........ 181/213; 181/250; 181/273; 181/274; 181/276; 181/279; 415/119; 60/770

(58) Field of Classification Search .................. 181/213, 181/215, 216, 217, 219, 222, 250, 270, 273, 181/274, 276, 279, 280, 295, 225; 244/1 N; 415/119; 60/770, 771

See application file for complete search history.

(56) References Cited

U.S. PATENT DOCUMENTS

| | | | | |
|---|---|---|---|---|
| 938,101 | A | * | 10/1909 | Winters ........................ 181/264 |
| 2,853,148 | A | * | 9/1958 | Billey ........................... 181/265 |
| 2,934,891 | A | * | 5/1960 | Brown ............................. 60/761 |
| 3,286,786 | A | * | 11/1966 | Wirt .............................. 181/213 |
| 3,286,787 | A | | 11/1966 | Wirt |
| 4,004,416 | A | * | 1/1977 | Amelio et al. .................. 60/264 |

(Continued)

FOREIGN PATENT DOCUMENTS
EP     1391597     2/2004

OTHER PUBLICATIONS

German Search Report dated Apr. 8, 2011 from related foreign application.

Primary Examiner — Edgardo San Martin
(74) Attorney, Agent, or Firm — Timothy J. Klima; Shuttleworth & Ingersoll, PLC

(57) ABSTRACT

A gas-turbine exhaust cone includes a cone shaped outside cone 1 closed in a flow direction, an inside cone 2 arranged in the outside cone 1 over at least part of the length of the exhaust cone, with the inside cone 2 being connected to the outside cone 1 via at least one helical partition wall 3, thereby forming an interspace 4 between the outside cone 1 and the inside cone 2. The interspace 4 is connected to inlet openings 5 at its inflow side and opens at an exit side 6 towards an interior 7 of the outside cone 1. A dampening element 8 is arranged in the outside cone 1 adjacent to the exit side 6 of the interspace 4.

20 Claims, 3 Drawing Sheets

U.S. PATENT DOCUMENTS

Figure 1:
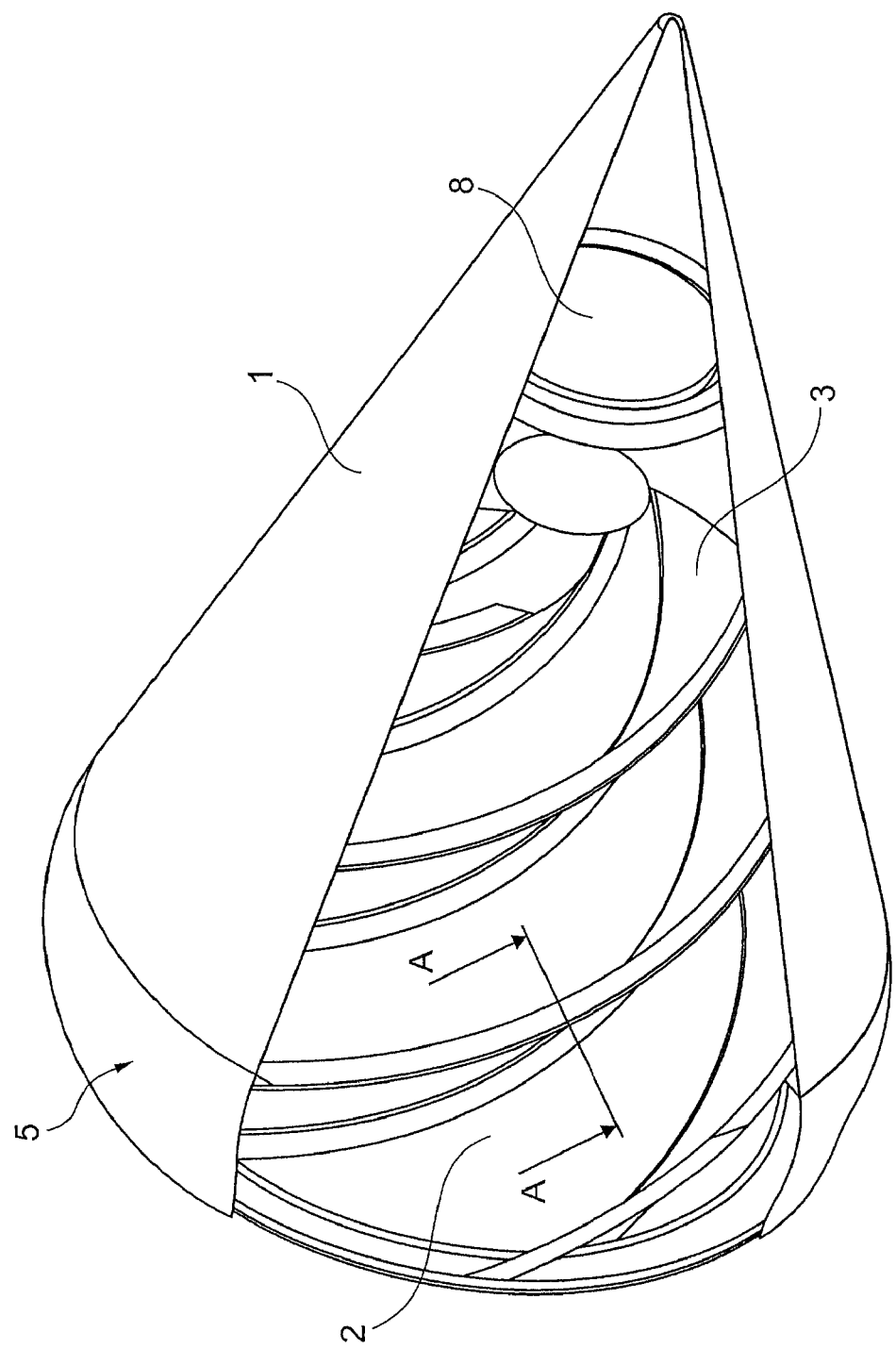

| | | | |
|---|---|---|---|
| 4,044,555 A * | 8/1977 | McLoughlin et al. | 60/264 |
| 4,050,539 A * | 9/1977 | Kashiwara et al. | 181/280 |
| 4,064,961 A * | 12/1977 | Tseo | 181/213 |
| 4,105,090 A * | 8/1978 | Tachibana et al. | 181/265 |
| 4,137,992 A | 2/1979 | Herman | |
| 4,199,936 A * | 4/1980 | Cowan et al. | 60/226.1 |
| 4,226,297 A * | 10/1980 | Cicon | 181/213 |
| 4,240,519 A | 12/1980 | Wynosky | |
| 4,244,441 A * | 1/1981 | Tolman | 181/213 |
| 4,947,958 A * | 8/1990 | Snyder | 181/296 |
| 5,210,383 A * | 5/1993 | Noxon | 181/290 |
| 5,491,310 A * | 2/1996 | Jen | 181/286 |
| 5,670,758 A * | 9/1997 | Borchers et al. | 181/286 |
| 5,760,349 A * | 6/1998 | Borchers et al. | 181/286 |
| 5,912,442 A * | 6/1999 | Nye et al. | 181/292 |
| 6,062,339 A * | 5/2000 | Hathaway | 181/156 |
| 6,164,058 A * | 12/2000 | Dobbeling et al. | 60/804 |
| 6,547,032 B2 * | 4/2003 | Yoon et al. | 181/229 |
| 6,615,576 B2 * | 9/2003 | Sheoran et al. | 60/39.5 |
| 6,799,657 B2 * | 10/2004 | Daniels | 181/252 |
| 6,845,607 B2 * | 1/2005 | Lair | 60/263 |
| 6,935,834 B2 * | 8/2005 | Lata Perez | 415/115 |
| 7,451,855 B2 * | 11/2008 | Wang | 181/286 |
| 7,784,283 B2 * | 8/2010 | Yu et al. | 60/770 |
| 7,891,195 B2 * | 2/2011 | Bouty et al. | 60/770 |
| 8,025,122 B2 * | 9/2011 | Gilcreest et al. | 181/213 |
| 8,037,967 B2 * | 10/2011 | Mercat | 181/292 |
| 2010/0251718 A1 * | 10/2010 | Ito et al. | 60/725 |

* cited by examiner

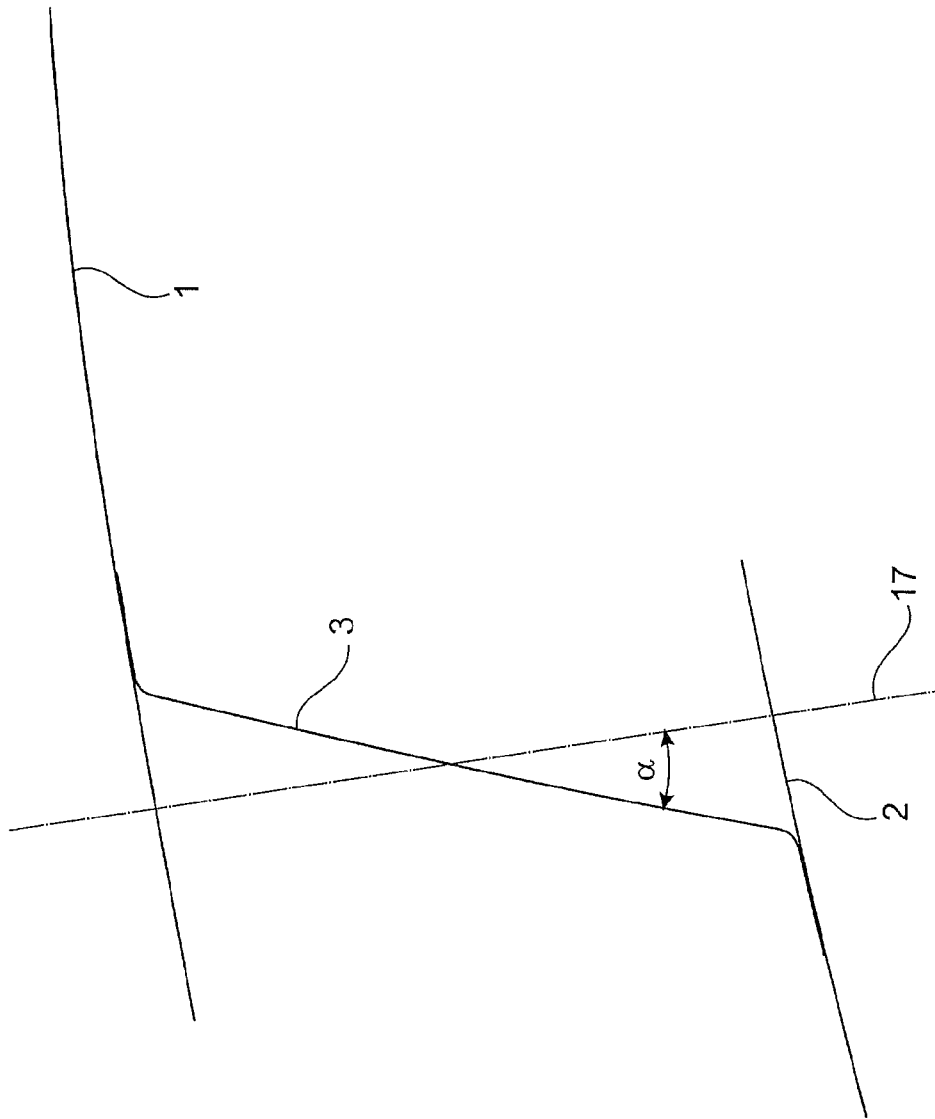

GAS-TURBINE EXHAUST CONE

This application claims priority to German Patent Application 102010026834.8 filed Jul. 12, 2010, the entirety of which is incorporated by reference herein.

This invention relates to a gas-turbine exhaust cone arranged at the outflow area of a gas turbine.

Gas turbines for aircraft engines require noise abatement. For this, various measures are known to minimize the noise of the gas stream exiting from an exhaust nozzle downstream of the turbine.

From the state of the art it is known to dampen the low frequencies occurring in particular on engines with lean combustion. Noise dampening is here accomplished by means of a Helmholtz resonator. It is known to provide such a Helmholtz resonator in the inflow area of the exhaust cone, while the downstream end area of the exhaust cone is merely conceived as geometric body. Known Helmholtz resonators are here provided as a system of radial walls and inner cylindrical ducts and dimensioned in dependence of the frequencies.

The known designs disadvantageously require reinforcing elements as they are heavily mechanically loaded in terms of the gas temperatures occurring. Also attributable to different walls and stiffening elements, the resultant design features a relatively high weight. Additionally, manufacture thereof requires high effort and investment. Manufacturing costs are still further increased by internal acoustic measures (perforations or similar). Further, the axial length of such a resonator requires considerable installation space, adding to the weight of the arrangement.

In a broad aspect, the present invention provides a gas-turbine exhaust cone of the type specified at the beginning which, while being simply designed and having a high dampening effect, can be manufactured cost-effectively and is characterized by low weight.

The exhaust cone according to the present invention first has an outside cone which is essentially closed in a flow direction. According to the present invention, an inside cone extends within the outside cone over at least part of the length of the exhaust cone and is connected to the outside cone via at least one helical partition wall. The resultant design is a double cone with an interspace formed between the outside cone and the inside cone. Extending in this interspace is the at least one helical partition wall. The interior is connected at an inflow side to inlet openings allowing sound waves to enter. These propagate in the interspace. The helical partition wall provides for a considerable running length. Thus, with the sound wave running length required for the Helmholtz resonator principle being provided by the helical partition wall, the axial length of the exhaust cone according to the present invention can be very short.

On the exit side, the interspace opens to an interior of the outside cone, with a dampening element being disposed in the outside cone adjacent to the exit side through which the sound waves enter the interior of the outside cone.

In a particularly advantageous embodiment the present invention provides for several spirally shaped partition walls.

The arrangement of the exhaust cone according to the present invention enables a Helmholtz resonator to be provided which is suitable for reducing in particular the low noise frequencies resulting from lean combustion.

The sound waves accordingly reach the spirally shaped Helmholtz resonator via the inlet openings. The spirally shaped, helical partition walls (preferably provision is made for several such partition walls) provide the required length of the Helmholtz resonator without the need to increase the installation length of the exhaust cone.

The helical or spirally shaped partition walls are arranged at an angle relative to the local radial direction of the outside cone. The partition walls are preferably welded to the outside cone, while they may be joined to the inside cone with blind rivets.

The helical partition wall is highly suitable for compensating thermal expansion since the latter results in displacement mainly in the axial direction, but not in the radial direction. This enables the loads on the outside cone to be substantially reduced. The helical partition walls accordingly twist together with the inside cone relative to the outside cone.

According to the present invention, a solid and stable design with low susceptibility to thermal loading is provided. This enables a thinner and therefore lighter outside cone to be conceived.

The dampening element according to the present invention, which is provided preferably in plate form, preferably in a honeycomb structure, is connected to the outside cone preferably via bellows, so that thermal loading is avoided also in this case.

Thus, a substantial increase in mechanical strength, together with a reduction in size and an improvement of the dampening effect, are obtained In a favourable embodiment of the present invention, it is provided that a second dampening element is arranged in the interior of the inside cone in the inflow area of the exhaust cone. This is again preferably located via bellows to compensate for thermal expansion or contraction.

The present invention is more fully described in light of the accompanying drawings showing preferred embodiments. In the drawings, FIG. 1 shows a perspective partial sectional view of an exhaust cone in accordance with the present invention, FIG. 2 shows an axial sectional view of the exemplary embodiment as per FIG. 1, and FIG. 3 shows a sectional view as per A-A of FIG. 1.

The exhaust cone according to the present invention includes an outside cone 1 tapering in flow direction, as known from the state of the art. As per FIG. 2, inflow is accordingly from the left, with the exhaust stream exiting from the turbine of an aircraft engine not being shown.

At its inflow area, the outside cone 1 is provided with inlet openings 5 (perforation) through which the sound waves 12 produced by the exhaust stream can enter the outside cone 1. In parallel with the outside cone 1, an inside cone 2 is provided which extends over a part of the axial length of the outside cone 1. The inside cone 2 is connected to the outside cone 1 by helical or spirally shaped partition walls 3. Here, it is preferably provided that the connection between the partition walls 3 and the outside cone 1 is made by welding, while a connection of the partition walls to the inside cone 2 can be made by riveting or similar. Other fastening methods can also be used.

Figure 2:
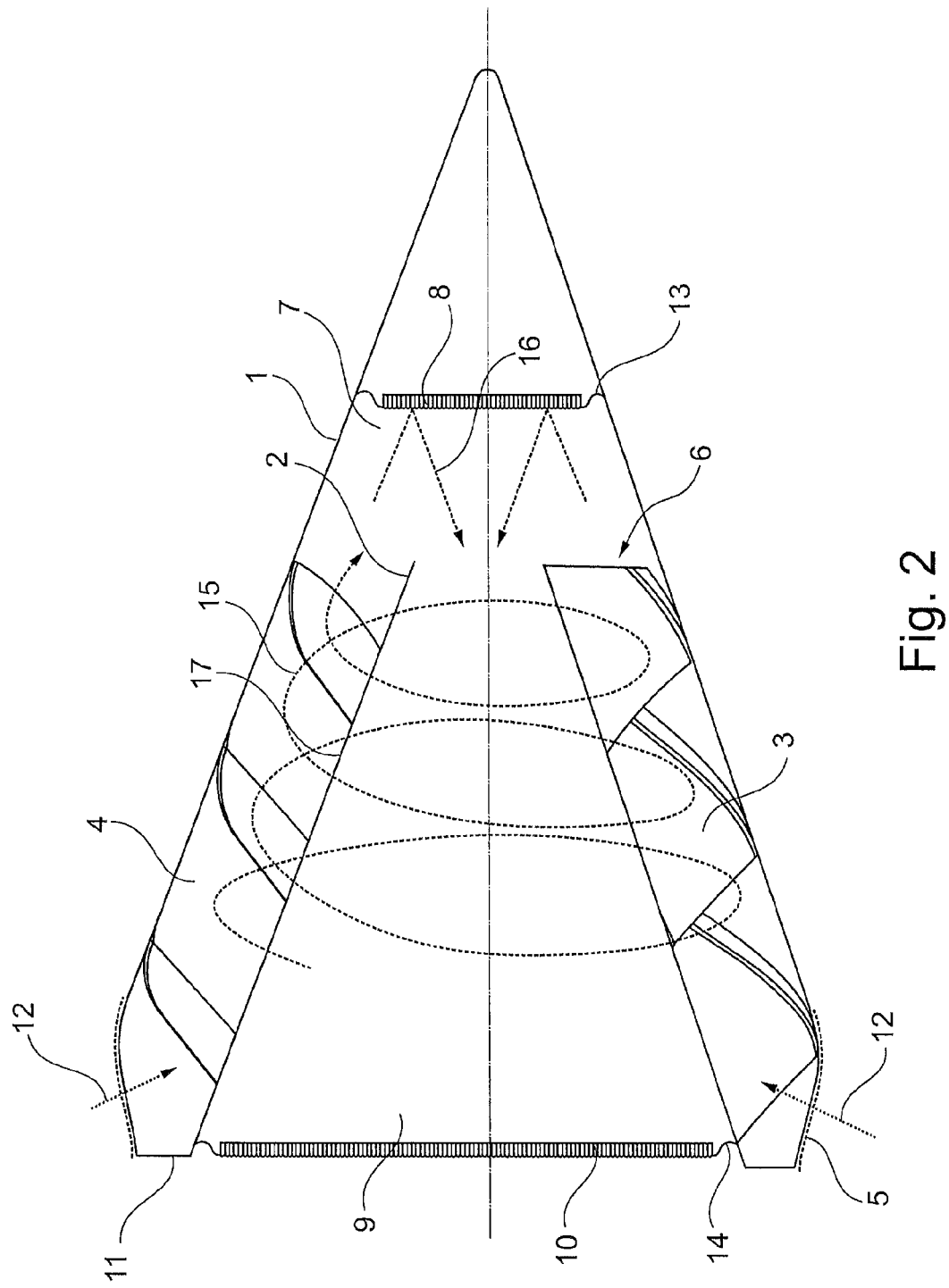

FIG. 2 shows an interspace 4 formed between the outside cone 1 and the inside cone 2. As a result of the helical design of the partition walls, an effective length 15 of the spiral chamber formed between the partition walls 3 in the interspace 4 is obtained. This effective length 15 enables an efficiently operating Helmholtz resonator to be provided, in particular in connection with the $\lambda/4$ effect of the dampening element 8 described hereafter.

The sound waves represented in helical form in FIG. 2 issue on the exit side 6 of the interspace 4 and reach an interior 7 of the outside cone 1. Here, the sound waves impinge on a flat dampening element 8 which can be provided with a honeycomb structure and conceived in the form of a $\lambda/4$ resonator.

FIG. 2 shows reflected sound waves 16 which may still be issued from the dampening element 8. These reflected sound waves 16 enter an interior 9 of the inside cone 2 and impinge on a plate-type dampening element 10 which is also provided as a λ/4 resonator.

The dampening element 10 is connected to, and located on, the inside cone 2 via bellows 14. Analogically, the dampening element 8 is located on the outside cone 1 by bellows 13.

Location and attachment of the entire exhaust cone is accomplished by an annular mounting flange 11. This mounting flange 11 is preferably firmly connected to the outside cone 1, while an expansion gap can be provided at the transition to the inside cone 2 to compensate for thermal loading by contraction or expansion.

With reference numeral 17, FIG. 2 shows an angular reference line illustrating that the partition wall is arranged at an angle of 5° to 15°, preferably 10°, to the reference line vertically aligned to the envelope surface of the outside cone 1 and the inside cone 2 arranged parallel thereto.

The two dampening elements 8, 10 are each provided as flat high-frequency dampeners.

FIG. 3 is a sectional view showing the inclination of the partition wall at an angle α to the radial direction 17.

LIST OF REFERENCE NUMERALS

1 Outside cone
2 Inside cone
3 Partition wall
4 Interspace
5 Inlet opening
6 Exit side
7 Interior of outside cone 1
8 Dampening element
9 Interior of inside cone 2
10 Dampening element
11 Mounting flange
12 Sound wave
13, 14 Bellows
15 Effective length
16 Reflected sound wave
17 Radial direction

What is claimed is:

1. A gas-turbine exhaust cone, comprising:
    a cone shaped outside cone closed in a flow direction;
    an inside cone positioned within the outside cone over at least part of a length of the exhaust cone;
    at least one partition wall spirally arranged between the outside cone and the inside cone and connecting the inside cone to the outside cone in a spaced apart manner to form an interspace between the outside cone and the inside cone;
    at least one inlet opening connected to the interspace at an inflow side thereof, the interspace opening at an exit side towards an interior of the outside cone; and
    a first dampening element positioned within an interior of the outside cone adjacent to the exit side of the interspace;
    wherein, the exhaust cone is a closed body other than the at least one inlet opening to prevent exhaust flow through the interspace between the inside and outside cones.

2. The gas-turbine exhaust cone of claim 1, and further comprising a plurality of spaced apart partition walls positioned between the outside cone and the inside cone, the plurality of partition walls being spirally arranged in the interspace.

3. The gas-turbine exhaust cone of claim 2, wherein the at least one inlet opening includes a plurality of inlet openings in perforation form.

4. The gas-turbine exhaust cone of claim 3, and further comprising a second dampening element positioned in an interior of the inside cone at the inflow side.

5. The gas-turbine exhaust cone of claim 4, wherein at least one of the dampening elements has a plate form, with a honeycomb structure and acts as a λ/4 resonator.

6. The gas-turbine exhaust cone of claim 5, wherein the spirally arranged partition walls are positioned at an angle of 5° to 15° to a perpendicular on a surface of one of the outside and inside cones.

7. The gas-turbine exhaust cone of claim 6, wherein at least one of the dampening elements is a high-frequency dampener.

8. The gas-turbine exhaust cone of claim 7, and further comprising an annular mounting flange connected to the outside cone at an end area on the inflow-side end area.

9. The gas-turbine exhaust cone of claim 8, wherein an interior of the exhaust cone opens to an exterior only via the plurality of inlet openings.

10. The gas-turbine exhaust cone of claim 1, wherein the at least one inlet opening includes a plurality of inlet openings in perforation form.

11. The gas-turbine exhaust cone of claim 1, and further comprising a second dampening element positioned in an interior of the inside cone at the inflow side.

12. The gas-turbine exhaust cone of claim 11, wherein at least one of the dampening elements has a plate form, with a honeycomb structure and acts as a λ/4 resonator.

13. The gas-turbine exhaust cone of claim 2, wherein the spirally arranged partition walls are positioned at an angle of 5° to 15° to a perpendicular on a surface of one of the outside and inside cones.

14. The gas-turbine exhaust cone of claim 1, wherein the first dampening element is a high-frequency dampener.

15. The gas-turbine exhaust cone of claim 1, and further comprising an annular mounting flange connected to the outside cone at an end area on the inflow-side end area.

16. The gas-turbine exhaust cone of claim 1, wherein an interior of the exhaust cone opens to an exterior only via the at least one inlet opening.

17. The gas-turbine exhaust cone of claim 1, wherein the first dampening element has a plate form, with a honeycomb structure and acts as a λ/4 resonator.

18. The gas-turbine exhaust cone of claim 11, and further comprising a bellows supporting at least one of the dampening elements to at least one of the inside and outside cones.

19. The gas-turbine exhaust cone of claim 18 and further comprising a first bellows supporting the first dampening element on the outside cone and a second bellows supporting the second dampening element on the inside cone.

20. A gas-turbine exhaust cone, comprising:
    a cone shaped outside cone closed in a flow direction;
    an inside cone positioned within the outside cone over at least part of a length of the exhaust cone;
    at least one partition wall spirally arranged between the outside cone and the inside cone and connecting the inside cone to the outside cone in a spaced apart manner to form an interspace between the outside cone and the inside cone;
    at least one inlet opening connected to the interspace at an inflow side thereof, the interspace opening at an exit side towards an interior of the outside cone; and
    a first dampening element positioned within an interior of the outside cone adjacent to the exit side of the interspace;
    a second dampening element positioned in an interior of the inside cone at the inflow side.

* * * * *